INVENTOR.
A. W. LIPPMAN
G. E. KROENING
BY John L. Shortley

United States Patent Office 3,326,397
Patented June 20, 1967

3,326,397
APPARATUS FOR HANDLING A BELT CONVEYOR
Arthur W. Lippmann, Oconomowoc, and Gerald E. Kroening, West Allis, Wis., assignors to Hewitt-Robins Incorporated, Stamford, Conn.
Filed Feb. 18, 1965, Ser. No. 433,682
6 Claims. (Cl. 214—83.26)

This invention relates to portable belt conveyor handling means. More particularly, this invention relates to apparatus for moving a discharge belt conveyor for a portable crushing plant such as disclosed in U.S.P. 3,073,536. However, it is contemplated to adapt the invention to other uses or combinations and therefore the invention is not limited to use with a crushing plant or other similar portable equipment.

Discharge conveyors for portable equipment of the type noted above should be quickly and easily moved from its stowed position to its operative position. Heretofore, movement of such conveyors required assistance of other equipment to move the conveyor from its operating position to a stowed position and vice versa. For example, in the patent cited above, the discharge conveyor must be lifted and laid across the trailer, i.e., overlying the elevating wheel 14. As a result, the belt itself must be removed from a supporting frame, or a specially constructed frame provided, and the belt elevated above the trailer to place the head end on the other side.

In addition, the arrangement according to the above patent increases the overall height of the trailer which often requires transit over a less direct route because the equipment cannot pass under a bridge or pass through a tunnel.

In view of the foregoing, it is an object of this invention to provide a structure for handling a conveyor which is economic and efficient.

The primary object of the invention, as presently conceived, is to provide an improved discharge conveyor handling apparatus for a portable crushing plant and similar equipment in which the conveyor must be stowed during transit, and also placed in operative position for use.

The above-noted objects and advantages, and additional objects and advantages, will become apparent from the following detailed description given in connection with the accompanying drawing which illustrates a presently preferred embodiment of the invention, and in which.

Figure 1:
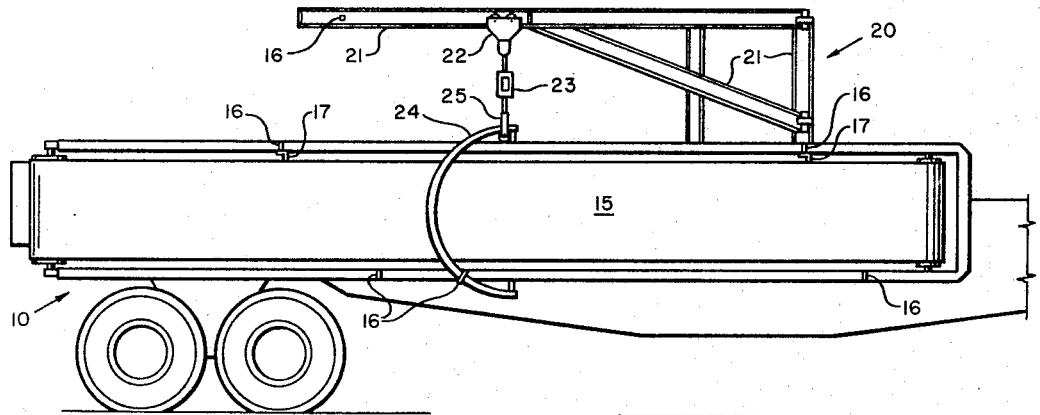
FIG. 1 is a side elevation of a portable crushing stone plant, shown schematically, with a discharge conveyor in stowed position according to the invention.
Figure 2:
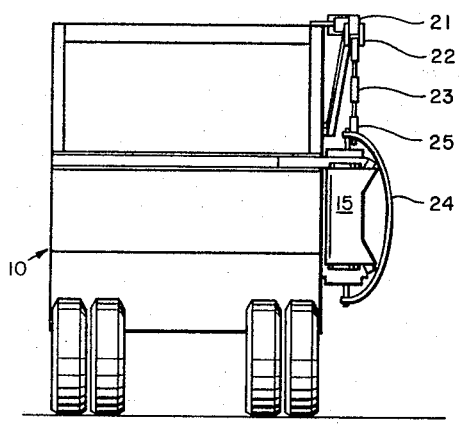
FIG. 2 is an end view of the apparatus shown in FIG. 1.

Referring to the drawing, reference numeral 10 designates a chassis for a stone crushing plant. The discharge belt conveyor, shown in the stowed position in FIGS. 1 and 2, is designated 15. The discharge conveyor comprises a rigid frame of conventional construction in which the conveyor rollers are secured. The apparatus comprising the improved conveyor handling apparatus is generally designated 20 and comprises a crane boom 21, a trolley 22, a chain or wire rope having a turnbuckle 23, a sliding shoe or roller block 25 and a lifting bail 24.

The lifting bail 24 is pivotally united with the conveyor frame in any suitable manner. The pivot of the bail 24 is located in a plane of the center of gravity of the conveyor so that the conveyor is balanced in the bail in the manner of a see-saw.

The conveyor 15 is secured in stowed position on the chassis 10 by suitable mounting brackets 17 and travel clamps 16 of any suitable design. In FIG. 1, the boom 21 and bail 24 are also shown in stowed position and held therein by travel clamps. As seen in FIGS. 1 and 2, the conveyor 15 is stowed snugly along the side of the conveyor without increasing the height of the plant and without extending appreciably outwardly from the side of the chassis. The bail 24 and boom 21 are likewise conveniently positioned without protruding or increasing the overall dimensions of the plant 10.

In order to transfer the conveyor to its operative position, the conveyor belt ties (not shown) and travel clamps 16 which hold the conveyor 15, bail 24, and crane boom 21 in position during transit are removed. The conveyor is raised by tightening the turnbuckle 23 until the conveyor is raised free of the mounting brackets. The conveyor is now swung outwardly by turning the boom 21 about its pivot and at the same time the conveyor can be rotated into its upright position. In rotating the conveyor into an upright position, the bail 24 slides through the block or shoe 25 and when the conveyor is upright the bail 24 and shoe 25 are locked together by any suitable known means (not shown). The trolley 22 carrying the conveyor is now rolled out toward the end of the boom 21 and the conveyor turned until it is in the position indicated by the broken lines in FIG. 3. The turning point in the conveyor suspension means can be provided at the trolley or elsewhere in the suspension linkage. The tail end 15a of the conveyor is now lowered and the trolley is rolled back toward the plant 10 until the tail end is in receiving position beneath the plant discharge hopper or shute. The conveyor is then secured to the plant by bolting or clamping, stabilizing braces 30 are put in place and the conveyor connected with a power source.

Figure 3:
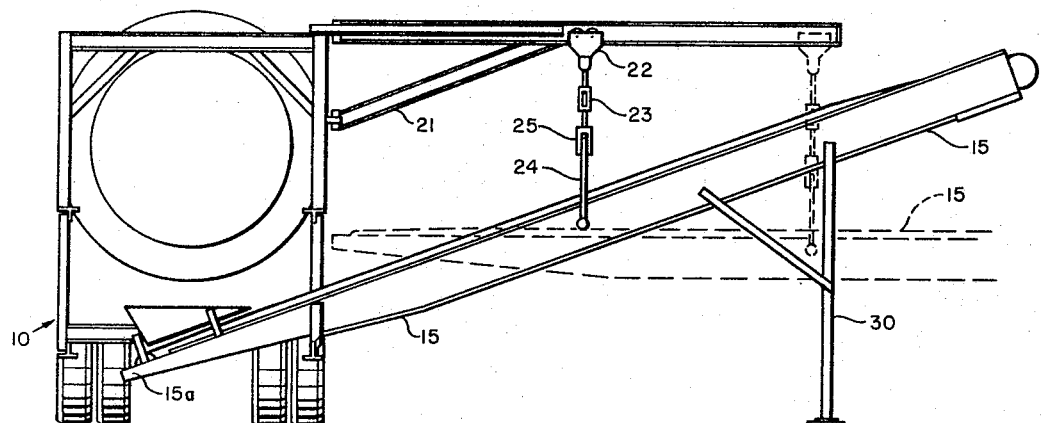
FIG. 3 is also an end view showing in full lines the operating position of the conveyor, and in broken lines an intermediate position of the conveyor.

By reversing the foregoing operations, the discharge conveyor can be moved from its operating position as shown in FIG. 3 and returned to the stowed position as seen in FIG. 1.

It will be apparent from the above that one or two men can quickly and safely handle the operation described above without the assistance of auxiliary equipment.

It is understood that variations may be made in the invention from that shown in the accompanying drawing without departing from the invention described. Therefore, the drawing is to be considered merely illustrative of our invention rather than the invention being limited to what is shown in the drawing.

We claim:
1. Apparatus for stowing a belt conveyor comprising in combination a portable plant, a crane boom pivotally mounted on said plant, a trolley mounted on said boom for movement longitudinally thereof; a belt conveyor means, a bail member pivotally secured on said conveyor, said bail member being located at the center of gravity of said conveyor, and means inter-connecting said bail member and trolley, said means including adjustment means coupled with said bail for movement of said bail relative to said last named means and attachment means slidably connected to said bail member for rotation of said conveyor about its longitudinal axis.

2. Apparatus according to claim 1 wherein said adjustment means interconnecting said trolley and bail member includes a turnbuckle for moving said conveyor relative to said trolley.

3. Apparatus for handling a belt conveyor comprising pivotally mounted crane boom, a trolley mounted on said boom for movement longitudinally thereof; a belt conveyor means including a semi-circular bail member pivotally secured thereon at the center of gravity of the conveyor means, and means coupling said bail member and said trolley including means slidably secured on said semi-circular bail for rotation of said conveyor about its longitudinal axis.

4. Apparatus according to claim 3 in combination with a truck chassis.

5. Apparatus for handling a belt conveyor comprising a pivotally mounted crane boom, means mounted on said boom for movement longitudinally thereof; belt conveyor means, a semi-circular bail member, means pivotally securing said bail member on said conveyor means at the center of gravity of said conveyor, a sliding member slidably mounted on said bail for rotation of said conveyor means about its longitudinal axis and hoist means connecting said sliding member and said means mounted on said boom.

6. Apparatus according to claim 5 in combination with portable equipment for treating and handling material.

References Cited
UNITED STATES PATENTS

| | | | |
|---|---|---|---|
| 2,040,790 | 5/1936 | Kaufmann | 287—61 |
| 2,050,495 | 8/1936 | Maynard | 287—61 |
| 2,169,453 | 8/1939 | Schenbeck | 214—83.26 X |
| 2,381,780 | 8/1945 | Simons | 214—83.36 |
| 2,399,360 | 4/1946 | Lacey | 294—78 |
| 2,574,792 | 11/1951 | Love | 214—83.26 |
| 2,703,252 | 3/1955 | Blackwell. | |
| 2,757,808 | 8/1956 | Mendez | 214—83.26 |
| 2,798,622 | 7/1957 | Kelley et al. | 214—75 |

GERALD M. FORLENZA, *Primary Examiner.*

ALBERT J. MAKAY, *Examiner.*